G. A. GEMMER.
AUTOMOBILE BRAKE ADJUSTER.
APPLICATION FILED NOV. 24, 1920.

1,397,373.

Patented Nov. 15, 1921.

INVENTOR.
George A. Gemmer,
BY
Everett Rook, ATTORNEYS.

UNITED STATES PATENT OFFICE.

GEORGE A. GEMMER, OF NEWARK, NEW JERSEY.

AUTOMOBILE-BRAKE ADJUSTER.

1,397,373.　　　　Specification of Letters Patent.　　Patented Nov. 15, 1921.

Application filed November 24, 1920. Serial No. 426,141.

*To all whom it may concern:*

Be it known that I, GEORGE A. GEMMER, a citizen of the United States, and a resident of Newark, in the county of Essex and State of New Jersey, have invented new and useful Improvements in Automobile-Brake Adjusters, of which the following is a specification.

This invention relates in general to mechanism for adjusting the lengths of connecting links, tie rods, and the like, and more particularly to an automobile brake adjuster for adjusting the length of the linkage connecting the brake pedal with the brake bands or shoes to obtain proper operating relation between the pedal and brakes.

The objects of the invention are to provide a mechanism of the character described whereby the rod or linkage can be manually adjusted without the necessity of disconnecting either end thereof from its associated elements; to provide an adjusting mechanism of this character having a threaded connection with the rod or linkage whereby the adjustment may be made without the necessity of rotating the rod or disconnecting the end thereof from the brake operating mechanism; to provide such an adjusting mechanism comprising a nut adapted to be threaded upon the rod and having a swivel connection with the associated elements, whereby rotation of the nut causes longitudinal movement of the rod relative to said associated elements; to secure an adjusting mechanism of this character comprising a nut adapted to be threaded upon the rod or linkage and having a swivel connection with a member adapted to be permanently connected to another element, whereby the rod can be moved longitudinally relatively to said element by mere rotation of said nut; to provide means for holding the adjusting nut against accidental rotation and vibration, and to obtain other advantages and results as may be brought out by the following description.

Referring to the accompanying drawings, in which like numerals of reference indicate the same parts throughout the several views.

Figure 1:
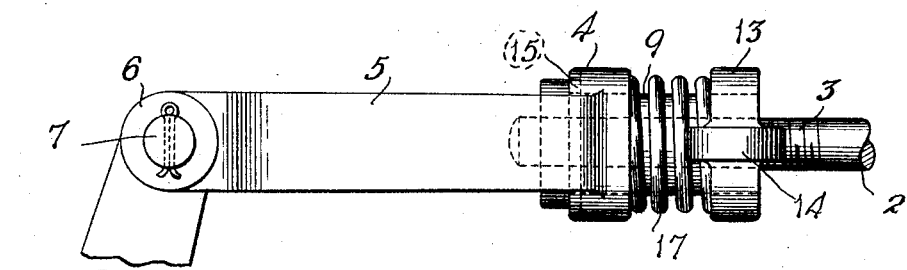
Figure 1 is a side elevation of a brake adjusting mechanism constructed in accordance with my invention, showing the same as applied to a conventional automobile brake mechanism.
Figure 2:
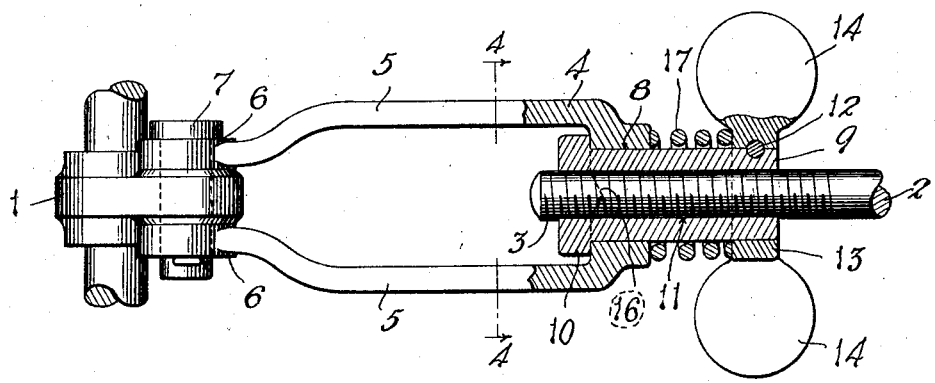
Fig. 2 is a top plan view thereof, portions being shown in section.
Figure 3:
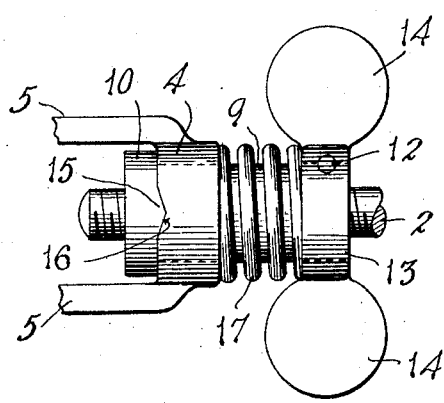
Fig. 3 is a fragmentary plan view of one end of the yoke and the adjusting nut.
Figure 4:
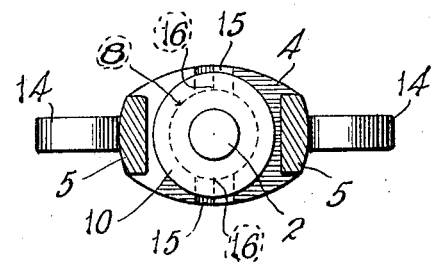
Fig. 4 is a transverse sectional view taken on the line 4—4 of Fig. 2.

My invention is illustrated on the drawings in connection with a conventional automobile brake mechanism including a bracket or crank arm 1 and a connecting rod 2 having one end thereof threaded as at 3. The adjusting mechanism embodying my invention is adapted to be interposed between the bracket or arm 1 and its associated connecting rod or link 2, and includes a substantially U-shaped yoke 4 having a pair of spaced and parallel arms 5 which are provided at one end thereof with attaching ears 6 adapted to receive between themselves the bracket or arm 1, which is pivotally connected to the yoke by means of a conventional pivot pin 7.

The opposite end or base of the yoke 4 is provided with a longitudinally extending opening 8 in which is rotatably and longitudinally slidably mounted a sleeve nut 9, the said nut being provided with an integral shouldered head or annular flange 10 at the inner end thereof adapted to engage the base of the yoke 4 to prevent the nut from moving longitudinally through the opening 8 in one direction. The nut 9 is provided with a threaded axial opening 11 to receive the threaded end of the connecting rod or link 2, and the outer end of the nut 9, or the end thereof opposite the flange 10, has rigidly connected therewith by any suitable means, such as the key or pin 12, a collar 13 formed with diametrically opposite radially projecting wings or finger holds 14. It will thus be seen that with this construction rotation of the sleeve nut 9 will, through the threaded connection thereof with the rod 2, cause longitudinal movement of the rod relative to the nut and yoke 4, it being understood that the rod 2 does not rotate but has its other end connected to other parts of the brake mechanism. To maintain the nut 9 against rotation to hold the rod 2 in an adjusted position, I provide the head 10 of the nut upon the side thereof which bears against the yoke with outwardly projecting diametrically extending ribs 15 which are adapted to seat in correspondingly shaped grooves 16 in the yoke 4, a compression spring 17 being interposed between the yoke 4 and the collar 13 to yieldingly hold the said ribs 15 in the grooves 16. This spring 17 also serves to prevent vibration or rattling of the nut 9 in the opening 8 of the yoke. The head 10 on the nut 9 prevents the nut from being pulled from the opening 8 in the yoke when the rod 2 is placed under tension to apply the brakes. To remove the sleeve nut 9 from the opening 8 it is merely necessary to remove the pin 12 and slide the collar 13 from the sleeve, whereupon the sleeve can be slid inwardly of the yoke 4 out of the opening 8.

When it is desired to take up objectionable slack between the brake pedal and the brake, or to adjust the length of the connecting linkage between two members with which my invention is utilized, it is merely necessary to manually rotate the adjusting nut 9 by means of the wings or finger holds 14 in the proper direction, whereupon the rod 2 is moved longitudinally relatively to the nut and yoke 4 to take up the slack, the yielding of the spring 17 allowing the rib 15 to ride outwardly from the grooves 16 during this rotation of the nut. When the desired adjustment has been obtained the ribs 15 are allowed to slide into the groove 16 and are held therein by the spring 17 to prevent further rotation of the nut. This adjustment eliminates the extremely objectionable and time-consuming adjusting of the brakes usual with the conventional mechanisms which necessitate the removal of the pivot pin 6 and disconnection of the connecting rod.

While I have shown my invention in connection with an automobile brake mechanism, it will be understood that it is equally well adapted for use with other connecting rods or linkage where adjustments in the length of the rod or linkage are desired. Furthermore, it will be understood that many modifications and changes can be made in the detail construction of my invention by those skilled in the art without departing from the spirit or scope thereof, and I do not wish to be understood as limiting myself in the construction and use of my invention except as required by the following claims when construed in the light of the prior art.

Having thus described the invention, what I claim is:

1. In mechanism of the character described, the combination of a member adapted to be connected to a mechanical element, a second member having a swivel connection with said first-mentioned member and adapted to be connected to another mechanical element, said members being yieldingly held against relative rotation in either direction.

2. In mechanism of the character described, the combination of a member adapted to be connected to a mechanical element, a second member having a swivel connection with said first-mentioned member and adapted to be connected to another mechanical element, and detent means yieldingly holding said members against relative rotation and allowing forcible rotation in either direction.

3. In mechanism of the character described, the combination of a member adapted to be connected to a mechanical element, a second member having a swivel connection with said first-mentioned member and adapted to be connected to another mechanical element, detent means for resisting relative turning of said members, and means for turning one of said members with respect to the other in either direction against said resisting means.

4. In mechanism of the character described, the combination of a member adapted to be connected to a mechanical element and having an opening therein, a second member rotatably mounted in said opening and adapted to be connected to another mechanical element, said members being yieldingly held against relative rotation in either direction.

5. In mechanism of the character described, the combination of a member adapted to be connected to a mechanical element and having an opening therein, a second member rotatably mounted in said opening and adapted to be connected to another mechanical element, and detent means yieldingly holding said members against relative rotation and allowing forcible rotation in either direction.

6. In mechanism of the character described, the combination of a member adapted to be connected to a mechanical element and having an opening therein, a second member rotatably mounted in said opening and adapted to be connected to another mechanical element, detent means for resisting turning of said second member with respect to the member in which it is mounted, and means on said second member for turning it in either direction against said resisting means.

7. In mechanism of the character described, the combination of a member adapted to be connected to a mechanical element and having an opening therein, a second member rotatably mounted in said opening and adapted to be connected to another mechanical element, coöperating detent means on said members at one end of the opening, and on the outside of said second member, and means at the other end of the opening for holding said detent means in engagement.

8. In mechanism of the character described, the combination of a member adapted to be connected to a mechanical element and having an opening therein, a sleeve rotatably mounted in said opening and adapted to be connected to another mechanical element, coöperating detent means on said sleeve and member at one end of the opening in the latter, means on said sleeve at the other end of said opening for holding said detent means in engagement, and means on the opposite end of the sleeve from the detent means for turning it in either direction against the same.

9. In mechanism of the character described, the combination of a member adapted to be connected to a mechanical element and having an opening therein, an interiorly threaded sleeve rotatably mounted in said opening and adapted to receive a correspondingly threaded mechanical element, detent means for resisting turning of said sleeve with respect to the member in which it is mounted, and means on said sleeve for turning it in either direction against said detent means.

10. In mechanism of the character described, the combination of a member adapted to be connected to a mechanical element and having an opening therein, an interiorly threaded sleeve rotatably mounted in said opening and adapted to receive a correspondingly threaded mechanical element, detent means for resisting turning of said sleeve with respect to the member in which it is mounted, and a helical spring on said sleeve between said turning means and the member in which the sleeve is mounted for holding the detent means normally in engagement.

11. In mechanism of the character described, the combination of a member adapted to be connected to a mechanical element having an opening therein and having a recess adjacent said opening, a second member rotatable and longitudinally slidable in said opening and having a threaded portion to receive another correspondingly threaded mechanical element, said second-mentioned member being provided at one end with a head having a rib to enter said recess and at the other end with a finger hold, and a spring interposed between said first-mentioned member and said finger hold to yieldingly maintain the said rib in the recess in said first-mentioned member to resist rotation of said second member.

12. In mechanism of the character described, the combination of a member adapted to be connected to a mechanical element and having an opening therein, a second member rotatable and longitudinally slidable in said opening and having a threaded portion to receive another correspondingly threaded mechanical element, said second-mentioned member being provided upon the ends thereof with outwardly extending projections, and a spring interposed between said first-mentioned member and one of said projections to maintain the other of said projections in yielding engagement with said first mentioned member.

13. In mechanism of the character described, the combination of a member adapted to be connected to a mechanical element having an opening therein and having a recess adjacent said opening, a second member rotatable and longitudinally slidable in said opening and having a threaded portion to receive another correspondingly threaded mechanical element, said second-mentioned member being provided upon the ends thereof with outwardly extending projections, and a spring interposed between said first-mentioned member and one of said projections to yieldingly maintain the other of said projections in the recess in said first-mentioned member to prevent rotation of said second member.

14. In mechanism of the character described, the combination of a member adapted to be connected to a mechanical element and having an opening therein, a second member rotatably mounted in said opening and having a threaded portion to receive another correspondingly threaded mechanical element, said second mentioned member being provided upon one end thereof with an outwardly extending projection adapted to engage the said first-mentioned member and being provided upon the other end thereof with a finger hold for rotating said second mentioned member, and a spring interposed between said first-mentioned member and said finger hold to hold said projection in engagement with said first-mentioned member.

GEORGE A. GEMMER.